United States Patent [19]

Park

[11] Patent Number: 4,735,371
[45] Date of Patent: Apr. 5, 1988

[54] DEVICE FOR WINDING A CORD SUCH AS AN ELECTRIC CORD

[75] Inventor: Hong C. Park, Seoul, Rep. of Korea

[73] Assignee: Gold Star Co., Ltd., Seoul, Rep. of Korea

[21] Appl. No.: 886,291

[22] Filed: Jul. 16, 1986

[30] Foreign Application Priority Data

Jul. 16, 1985 [KR] Rep. of Korea ................. 5102/1985

[51] Int. Cl.⁴ .......................................... B65H 75/36
[52] U.S. Cl. .................................................. 242/47.5
[58] Field of Search ................. 242/47.5, 55.01, 129.1, 242/153, 154; 191/12 R, 12 S; 137/355.16, 355.2, 355.28; 226/113, 118, 119

[56] References Cited

U.S. PATENT DOCUMENTS

| | | | |
|---|---|---|---|
| 588,378 | 8/1897 | Bean et al. | 242/47.5 |
| 2,503,018 | 4/1950 | Wittman | 242/47.5 |
| 2,560,204 | 7/1951 | Andren | 242/47.5 X |
| 2,837,292 | 6/1958 | Adamson | 242/47.5 |
| 4,570,866 | 2/1986 | Drower | 242/47.5 |
| 4,603,800 | 8/1986 | Focke et al. | 242/47.5 X |

Primary Examiner—Stanley N. Gilreath
Attorney, Agent, or Firm—Cushman, Darby & Cushman

[57] ABSTRACT

A device for winding a cord having upper and lower guide plates, each having a longitudinal guide slot. Slide knobs mounted on the guide plates each have transfer guide slots. Winding rods are slide-mounted in each transfer guide slot and extend through the longitudinal guide slots of the upper and lower guide plates. As the slide knob slides along the guide plates, the winding rods slide along the longitudinal and transverse guide slots to form a zig-zag arrangement for winding a cord thereabout.

1 Claim, 3 Drawing Sheets

DEVICE FOR WINDING A CORD SUCH AS AN ELECTRIC CORD

BACKGROUND OF THE INVENTION

The present invention relates to a device for winding a cord such as an electric cord, and particularly to a cord-winding device comprising upper and lower guide plates each having a longitudinal guide slot, a slide knob slideably mounted to said guide plates and having upper and lower plates each provided with transversal guide slots, and winding rods each slideably mounted to each transversal guide slot of said slide knob, a port of said winding rods mounted to the upper plate of said slide knob slideably inserted into the longitudinal guide slot of said upper guide plate and the other part of said winding rods mounted to the lower plate of said slide knob slideably inserted into the longitudinal guide slot of said lower guide plate so that as said slide knob slides along said guide plates, winding rods slide along said longitudinal and transversal guide slots and take an arrangement of a Zig-Zag type to wind a cord therearound.

A typical conventional cord-winding device used in electric and electronic articles is illustrated in FIG. 1, wherein a cord 23 is wound around a rotating disc plate 22 by means of an elastic force of a rubber band or a spring 21. Due to the large volume, such a cord-winding device can be applied only to articles which have a large volume and a large dead space, such as electric rice pots. Such a cord-winding device can not be used in a small size articles such as, a compact cassette tape recorder. When the spring 21 is separated at one end or when the spring force of said spring becomes weak, the cord-winding device can not be used. And also such a conventional device can not adjust the length the cord used and can not be used for a cord subjected to a high tension.

Furthermore, a severe noise is generated during winding the cord 23 in the conventional device, since the rotating disc plate 22 which is pivotly supported to the casing 24 which is fixedly disposed in the interior of the article rotates by the return spring force of the spring 21 to wind the cord therearound.

SUMMARY OF THE INVENTION

Therefore, an object of the present invention is to provide a cord-winding device which can eliminate the problems encountered in the above-mentioned prior art.

Another object of the present invention is to provide a cord-winding device for eliminating the use of a spring, and thus, enabling the extension of the useful cord life and the prevention of noise during the winding of the cord.

Another object of the present invention is to provide a cord-winding device enabling the adjustment of the wound length of cord, so that the using length of cord can be adjusted, as desired.

In accordance with the present invention, these objects can be accomplished by providing a device for winding a cord comprising: a guide having at one end thereof a side wall provided with a cord-through hole and upper and lower guide plates fixedly mounted to upper and lower surfaces of said side wall, respectively, and spaced from each other, said upper guide plate having a longitudinal guide slot shaped into a "$\int$" type including straight slot portions extending in parallel with each other at respective longitudinal sides thereof and an inclined slot portion at the middle thereof and said lower guide plate having a longitudinal guide slot shaped into the reversed same type as that of said slot of upper guide plate such that inclined slot portions of said slots are crossed at the middles thereof and one-side straight slot portion of one slot are longitudinally aligned with the other-side straight slot portion of the other slot; a slide knob supported to said guide to longitudinally slide therealong and having upper and lower plates each provided with a plurality of transversal guide grooves, all transversal guide grooves of said plates arranged at different longitudinal positions on said slide knob; and a plurality of winding rods engaged with respective transversal guide grooves formed at said slide knob to slide therealong, the part of said winding rods each, engaged with the corresponding guide groove of the upper plate of said slide knob, slideably supported at the upper end thereof to said corresponding groove of the upper plate of the slide knob and downwardly extended through the longitudinal guide slot formed at said upper guide plate of the guide and the other part of said winding rods each, engaged with the corresponding guide groove of the lower plate of said slide knob, slideably supported at the lower end thereof to said corresponding groove of the lower plate of the slide knob and upwardly extended through the longitudinal guide slot formed at said lower guide plate of the guide, so that as said slide knob longitudinally slides toward said side wall of the guide along the guide, said winding rods slide along both corresponding respective longitudinal guide slots and respective transversal guide grooves and take an arrangement of a Zig-Zag type to wind a cord therearound.

In the above-mentioned construction, the wound length of the cord can be varied depending upon the sliding amount of the slide member along the guide.

When the wound cord is outwardly drawn, the slides knob slides outwardly along the guide, so that winding rods, which have taken an arrangement of a Zig-Zag type at inward straight slot portions of the longitudinal guide slots, is disposed at outward straight slot portions of the longitudinal guide slots and take an arrangement of a parallel type to unwind the cord therefrom.

The above-mentioned construction eliminates the use of a spring which is required in the prior art, thereby enabling the extension of the using life thereof and the prevention of generating a noise during the winding of cord.

BRIEF DESCRIPTION OF THE DRAWINGS

Further objects and advantages of the present invention will be apparent from the following description of a preferred embodiment of the invention which is shown in the accompanying drawings, wherein:

FIG. 4A to 4C are schematic plan views of a cord winding device wherein FIG. 4A shows a condition when a cord is unwound, FIG. 4B a condition when a cord is partially wound, and FIG. 4C a condition when a cord is completely wound.

DETAILED DESCRIPTION OF THE PREFERRED EMBODIMENT

Figure 1:
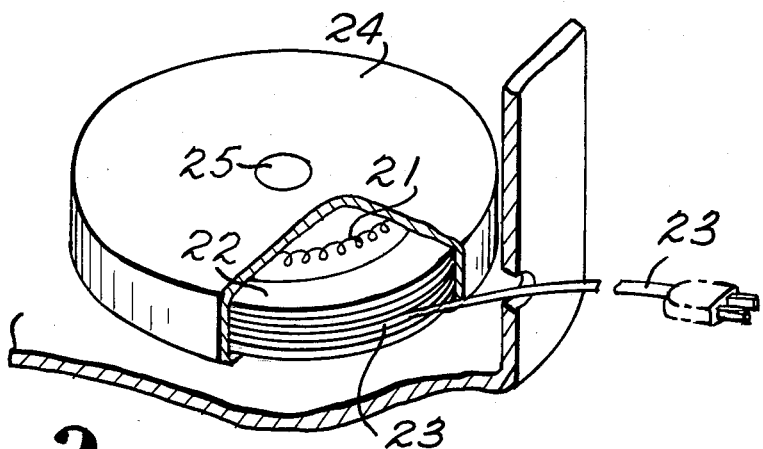
FIG. 1 is a partially broken-out perspective view of a conventional cord winding device.
Figure 2:
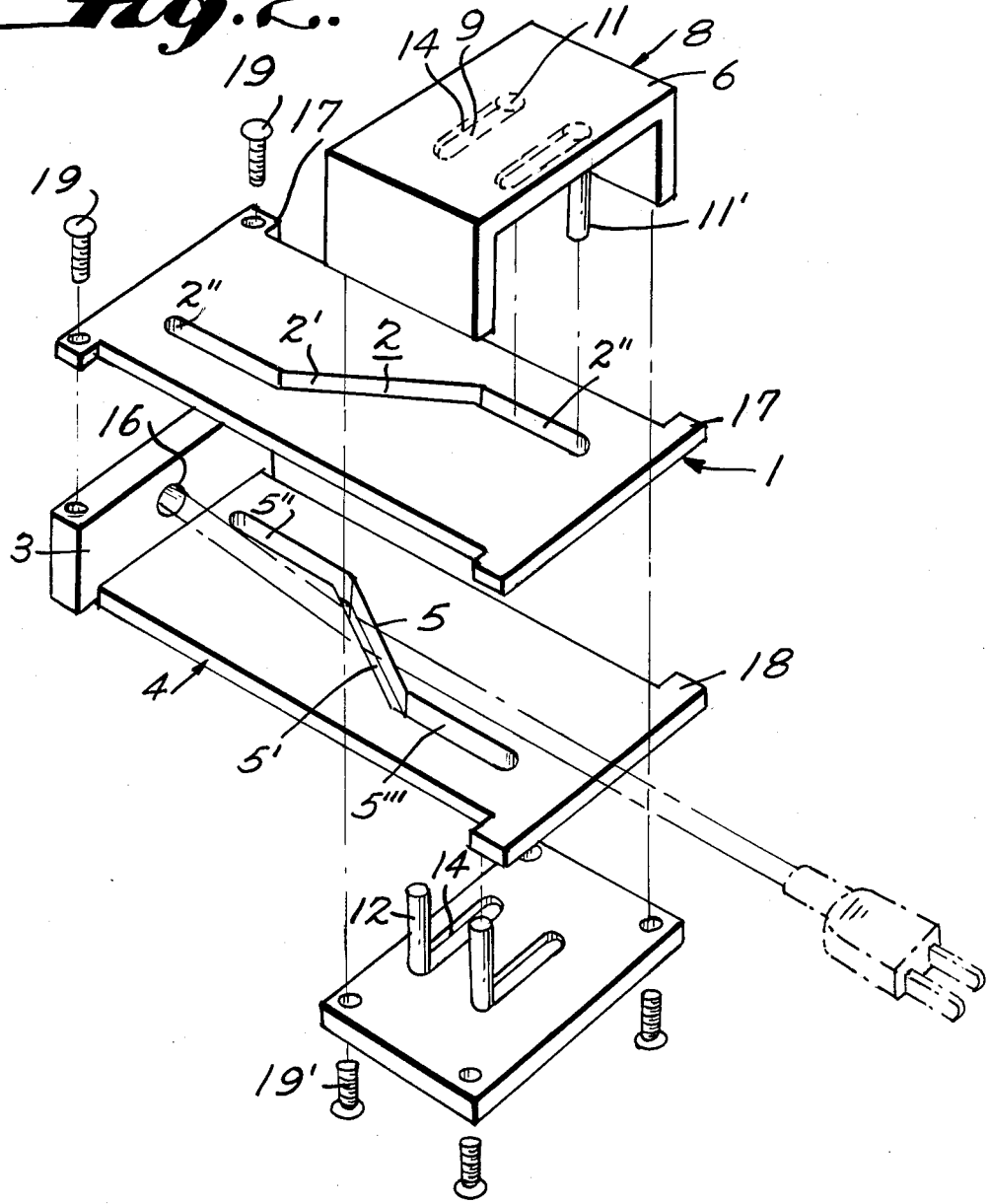
FIG. 2 is a exploded perspective view of a cord winding device in accordance with the present invention.
Figure 3A:
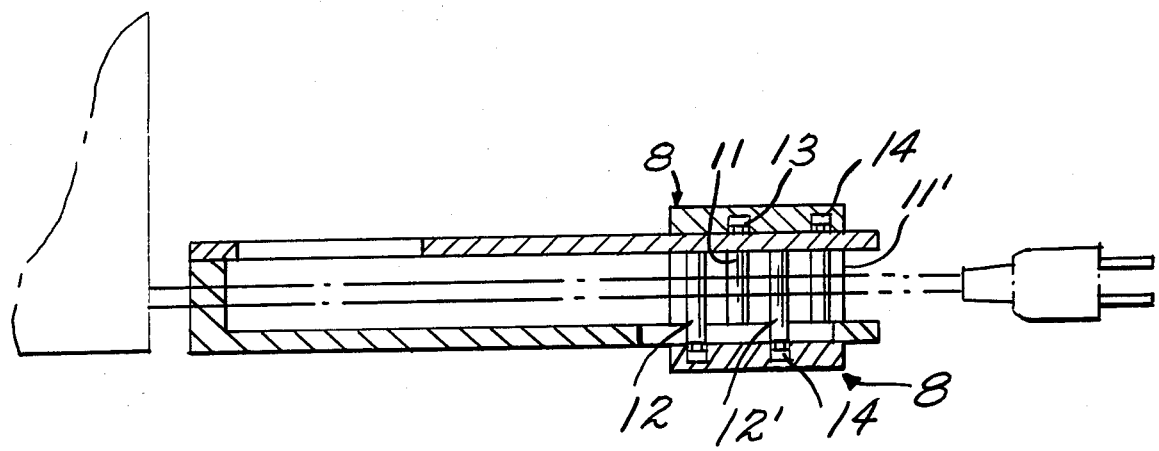
FIG. 3A is a sectional view of a cord winding device shown in FIG. 2.
Figure 3B:
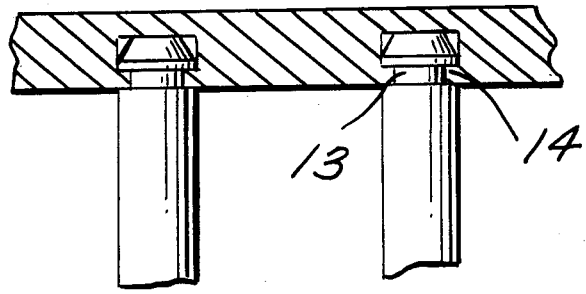
FIG. 3B is an enlarged view of a part of winding rod in accordance with the present invention which shows one end of the winding rod provided with an annular groove.
Figure 3C:
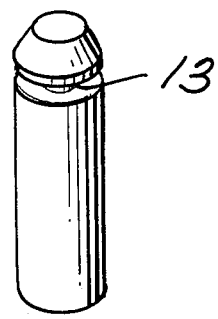
FIG. 3C is a perspective view of a winding rod of the present invention.

Referring to FIG. 2, a cord winding device in accordance with the present invention includes a guide comprising upper and lower guide plates 1 and 4 vertically spaced from each other and a side wall 3 disposed at one end, that is, the inward end of said guide. The side wall 3 can be integrally formed with either one or both of the guide plates, or separately formed with the guide plates. In the illustrated embodiment of the present invention, the side wall 3 is integrally formed with the lower guide plate 4. The upper guide plate 1 is fixedly mounted on the upper surface of the side wall 3 by means of screws. The upper guide plate 1 has a longitudinal guide slot 2 shaped into a

type including an inclined slot portion 2' at the middle thereof and inward and outward straight slot portions 2" and 2''' disposed at both longitudinal sides of said inclined slot portion 2' and extended in parallel with each other. Similarly, the lower guide plate 4 has a longitudinal guide slot 5 shaped into a

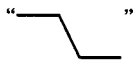

type including an inclined slot portion 5' at the middle thereof and inward and outward straight slot portions 5" and 5''' disposed at both longitudinal sides of said inclined slot portion 5' and extended in parallel with each other. The longitudinal guide 5 of the lower guide plate 4 is shaped into a reversed same type as that of the longitudinal guide slot 2 of the upper guide plate 1 such that inclined slot portions 2' and 5' of said guide slots are crossed at the middle thereof and such that inward and outward straight slot portions 2" and 2''' of the guide slot 2 are longitudinally aligned with outward and inward straight slot portions 5''' and 5" of the guide slot 5, respectively. The side wall 3 extends laterally beyond the width of the lower guide plate 4 and has at the middle thereof a cord-through hole 16 through which a cord 15 longitudinally extends between upper and lower guide plates 1 and 4.

Around the guide, a slide knob 8 is disposed to longitudinally slide along said guide. The slide knob 8 includes an upper plate 6 slideably contacting with the upper surface of the upper guide plate 1, and a lower plate 7 fixedly mounted at each lateral end thereof to a lower end of a lateral wall extending downwardly from each lateral end of said upper plate 6 and slideably contacting with the lower surface of the lower guide plate 4. The guide plates 6 and 7 have a plurality of transversal guide grooves 9 and 10 arranged at different longitudinal positions on the slide knob 8, respectively. In the illustrated embodiment of the present invention, the number of transversal guide grooves formed at each plate of the slide knob is two. Each transversal guide groove has flanges 13 at both side edges thereof, respectively. In the transversal guide grooves 9 formed at the upper plate 6 of the slide knob 8, winding rods 11 and 11' are supported at their upper ends to slide along said guide grooves 9, respectively. In detail, each winding rod has at the upper end thereof an annular groove 13 engaging with flanges 14 of the corresponding guide groove 9, as shown in FIGS. 4B and 4C.

Winding rods 11 and 11' downwardly extend through the longitudinal guide slot 2 of the upper guide plate 1. Accordingly, each winding rod slides along both the longitudinal guide slot 2 and corresponding transversal guide groove 9, as the slide knob 8 slides longitudinally along the guide. In the transversal guide grooves 10 formed at the lower plate 7 of the slide knob 8, winding rods 12 and 12' are supported at their lower ends to slide along said guide grooves 10, respectively. In detail, each winding rod has at the lower end thereof an annular groove 13 engaging with flanges 14 of the corresponding guide groove 10. Winding rods 12 and 12' upwardly extend through the longitudinal guide slot 5 of the lower guide plate 4. Accordingly, each winding rods slides along both longitudinal guide slot 2 and corresponding transversal guide groove 10, as the slide knob 8 slides longitudinally along the guide. In the drawings, reference numerals 17 and 18 denote protrusions laterally formed at respective outward ends of upper and lower guide plates to avoid the separation of the slide knob 8 from the guide, 19 screws for fixing the upper guide plate 1 to the side wall 3 of the guide, 19' screws for fixing the lower plate 7 to the upper plate 6 of the slide knob 8, and 20 an electronic article equipped with the device of the present invention.

Since longitudinal guide slots 2 and 5 are crossed at their inclined slot portions and transversal guide grooves 9 and 10 are arranged at different longitudinal positions on the slide knob 8, in accordance with the present invention, winding rods 11, 11', 12 and 12' take the arrangement of a Zig-Zag to wind the cord 15 therearound, as they slide inwardly, that is, toward the side wall of the guide disposed adjacent to a body of the electronic article 20.

Now, the operation of the cord winding device of the present invention will be described in detail, with reference to FIGS. 4A to 4C.

Figure 4A:
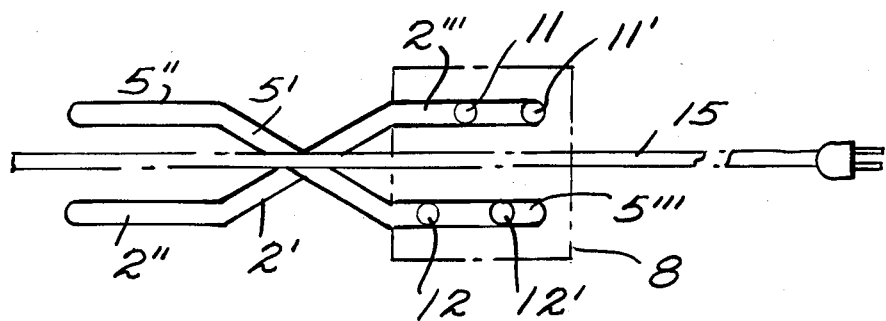
Figure 4B:
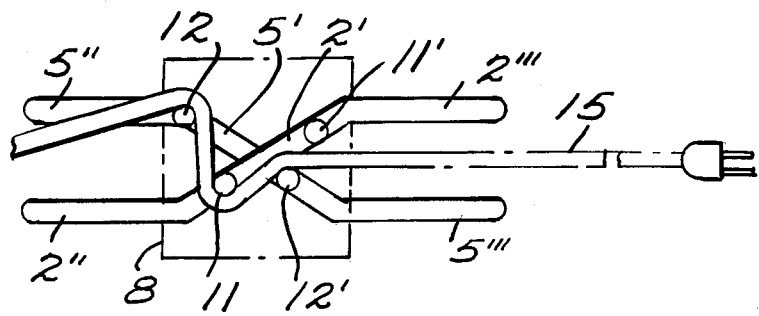
Figure 4C:
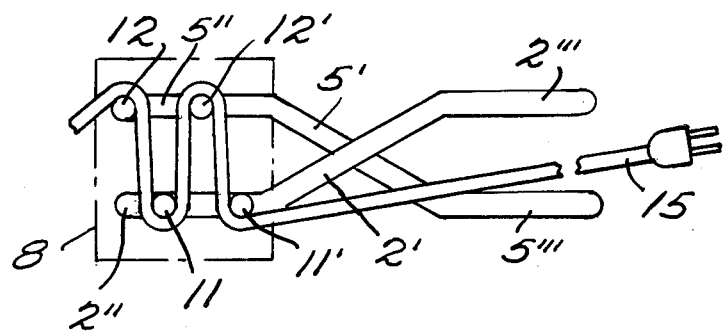

FIG. 4A shows a condition when the cord 15 is unwound. Under this condition, the slide knob 8 is disposed at the outward end of the guide. Winding rods 11, 11' and 12, 12' are disposed at respective outward straight slot portions 2''' and 5''' of longitudinal guide slots 2 and 5 and at respective outward lateral ends of transversal guide grooves 9 and 10. Accordingly, winding rods 11, 11', 12 and 12' take an arrangement of a parallel type.

As the slide knob 8 continuously slides inwardly along the guide to pass the middle portion of the guide from the above-mentioned condition, as shown in FIG. 4B, winding rods 12, 11, 12' and 11' sequentially pass the corresponding inclined slot portions 5' and 2' of respective guide slot 5 and 2 and come to take an arrangement of a Zig-Zag type. Thus, they come to wind the cord 15 therearound.

As the slide knob 8 continuously slides inwardly along the guide until winding rods reach the corresponding inward straight slot portions 2″ and 5″ of respective guide slot 2 and 5, the wound length of the cord 15 around winding rods is gradually increased. When the sliding movement of the slide knob 8 along the guide is completed as shown in FIG. 4C, the cord 15 is completely wound in a type of Zig-Zag around winding rods arranged in a type of Zig-Zag.

Unwinding of the cord 15 can be accomplished by outwardly pulling the cord 15 so as to outwardly slide the slide knob 8 along the guide.

As is apparent from the above description, the wound length of the cord 15 varies depending upon the sliding length of the slide knob 8 along the guide. Therefore, the using length of the cord can be adjusted as desired.

The device of the present invention eliminates the use of a spring which is required in the prior art, thereby enabling the extension of the useful life thereof and the prevention of generating a noise during the winding of cord.

The device of the present invention can be assembled with a body of the article, to which the present device is applied, or separately used. The size of the device can be also small. Accordingly, the device of the present invention can be easily disposed at any place of the article and applied to even small or compact articles.

While the invention has been described with reference to a preferred embodiment, various changes may be made without departing from the scope of the invention as defined by the following claims.

What is claimed is:

1. A device for winding a cord, such as, an electric cord comprising;

a guide having at one end thereof a side wall provided with a cord-through hold and upper and lower guide plates fixedly mounted to upper and lower surfaces of said side wall, respectively, and spaced from each other, said upper guide plate having a longitudinal guide slot shaped into a 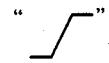 type including straight slot portions extending in parallel with each other at respective longitudinal sides thereof and an inclined slot portion at the middle thereof and said lower guide plate having a longitudinal guide slot shaped into the reversed type as that of said slot in upper guide plate such that inclined slot portions of said slots are crossed at the middle thereof and straight slot portions of one slot are longitudinally aligned with the straight slot portions of the other slot;

a slide knob supported by said guide to longitudinally slide therealong and having upper and lower plates each provided with a plurality of transverse guide grooves, the transverse guide grooves of said plates arranged at different longitudinal positions in said slide knob; and a plurality of winding rods engaged with respective transverse guide grooves formed in said slide knob to slide therealong, a portion of said winding rods engaged with the corresponding guide groove of the upper plate of said slide knob and being slideably supported at the upper end thereof in said corresponding groove of the upper plate of the slide knob and downwardly extending through the longitudinal guide slot formed at said upper guide plate of the guide, another portion of said winding rods engaged with the corresponding guide groove of the lower plate of said slide knob and being slideably supported at the lower end thereof in said corresponding groove of the lower plate of the slide knob and upwardly extending through the longitudinal guide slot formed in said lower guide plate of the guide, so that as said slide knob longitudinally slides toward said side wall of the guide along the guide, said winding rods slide along both corresponding respective longitudinal guide slots and transverse guide grooves and form a Zig-Zag type shape to wind a cord therearound.

* * * * *